No. 747,187. PATENTED DEC. 15, 1903.
A. O. KITTREDGE.
BANK CHECK.
APPLICATION FILED NOV. 13, 1902. RENEWED NOV. 19, 1903.
NO MODEL.
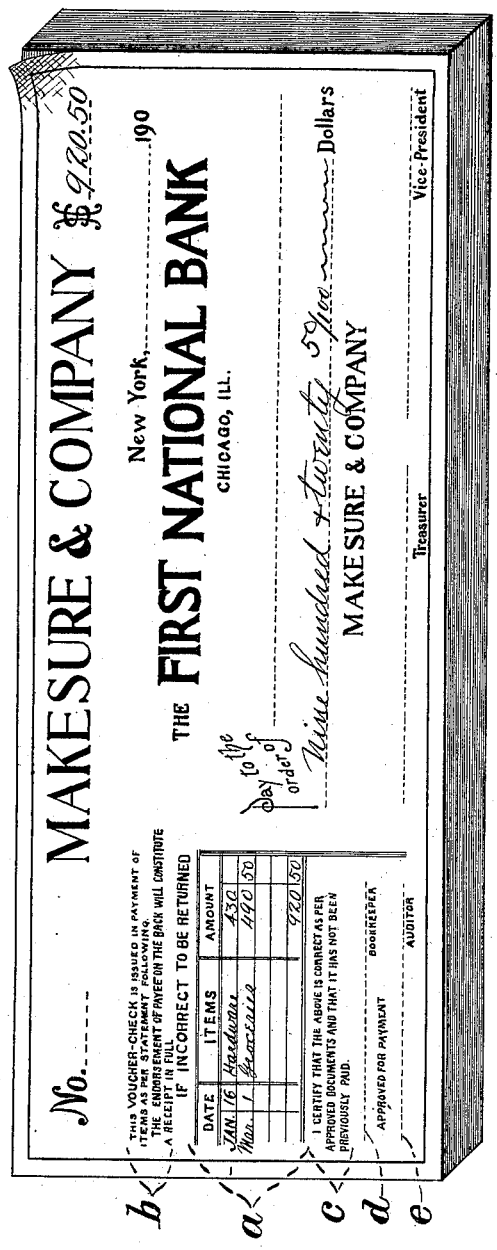
Attest:
L. Lee
Arthur F. Heater
Inventor.
Anson O. Kittredge, per
Thomas S. Crane, Atty.

No. 747,187. Patented December 15, 1903.

UNITED STATES PATENT OFFICE.

ANSON O. KITTREDGE, OF SPRINGFIELD, MASSACHUSETTS, ASSIGNOR, BY MESNE ASSIGNMENTS, TO ACCOUNT-AUDIT COMPANY, A CORPORATION OF NEW YORK.

BANK-CHECK.

SPECIFICATION forming part of Letters Patent No. 747,187, dated December 15, 1903.

Application filed November 13, 1902. Renewed November 19, 1903. Serial No. 181,863. (No model.)

*To all whom it may concern:*

Be it known that I, ANSON O. KITTREDGE, a citizen of the United States, residing at 42 Leyfred Place, Springfield, county of Hampden, State of Massachusetts, have invented certain new and useful Improvements in Bank-Checks, fully described and represented in the following specification and the accompanying drawings, forming a part of the same.

The object of the present invention is to furnish a bank-check which may serve not only as a draft for securing payment of a specified sum, but also as a statement of the account for which the payment is made, a verified certificate that such account is correct, and a receipt for the items stated in the account.

Heretofore printed forms called "voucher-checks" have been used to embody the characteristics just described; but the statement of account, the verification of the same, and the receipt for the items stated in the account have been disposed upon the printed form in such manner that it was materially larger than an ordinary bank-check, and therefore required folding to bundle and pack with ordinary checks, notes, and drafts, which rendered it totally unfitted for handling and use as an ordinary bank-check.

Banks of draft and deposit object very seriously to the handling of folded papers, as they cannot be slipped one over another and moved among one another with the same facility as unfolded slips. Furthermore, the entries upon such a paper are not all visible when it is folded, and the handling required to unfold the paper for inspection of all the entries involves time which cannot readily be afforded where a great number of such papers must be handled in a short time.

In the present invention I make the bank-check of usual form and dimensions and retain the characteristic appearance of the check by filling the greater part of its body with the name of the bank and the usual order for payment, as well as the name of the drawer, when desired.

To alter the functions of the check, I apply all the additional features in a space at one end of the check, preferably upon the left hand, so as not to interfere with the signing of the check in the usual manner at the right-hand end, and the inspection and handling of the check by the bank tellers and clerks, as is common. The check does not, therefore, require folding and is not distinguishable in the convenience of its use from any ordinary check, while it possesses all the additional characteristics which have been heretofore secured only by greatly increasing its dimensions or folding it double.

The invention will be understood by reference to the annexed drawing, which shows a pad of such checks.

Upon the top of the check is the name of the drawer, below that the usual line for the place and date, and then following the name of the bank with blank lines beneath for the name of the payee and the written amount. The place for the signature is in the lower right-hand end, as usual. The novel characteristics consist, first, of the ruled columns $a$, headed, respectively, "Date," "Items," and "Amount" for inserting the date and items of account and the aggregate amount of the account which is settled by the check. Two items are shown in the columns aggregating nine hundred and twenty dollars and fifty cents, for which amount the check is drawn, as shown by the figures "$920.50" written upon the proper line and inserted in numbers at the upper right-hand corner of the check; second, above the ruled columns is a "receipt reference" (designated $b$) in the following words: "This voucher-check is issued in payment of items per statement following. The indorsement of payee on the back will constitute a receipt in full. If incorrect to be returned;" third, below the ruled columns is a "certificate of verification" (designated $c$) in the following form: "I certify that the above is correct as per approved documents and that it has not been previously paid." Beneath such certificate is a line $d$ for the signature of a suitable person, such line being marked with the word "Bookkeeper," and below the same is another line, $e$, marked "Approved for payment," with the word "Auditor."

The drawings show that the ruled columns, the receipt reference, and the certificate of verification can be applied to the check in a space of such dimensions as not to disfigure the check or require its enlargement or interfere in any manner with the performance of its ordinary functions.

The specific arrangement of the receipt reference b above the statement of account enables it to refer to the statement following, which is contained in the column a, as showing the amount for which the check when indorsed becomes a receipt. The specific arrangement of the certificate of verification below the ruled columns enables them to refer to the above as the particular account of which verification is made. The arrangement of these three features in such a condensed form at one end of the check thus enables them to perform functions conjointly, which they could not perform if separated or disposed at different parts of the check, while their conjunction condenses them in the smallest possible space, so that the remainder of the check may present the usual appearance.

The objects accomplished by the statement of account, by the receipt reference, and by the certificate of verification are of great importance, but heretofore they have not been used as much as desired, as no means prior to the present invention has been found for combining them with a bank-check without enlarging the same and disfiguring the check, as well as interfering seriously with the handling and filing of the same in connection with other checks and drafts of usual form. By the particular arrangement of these features I have successfully disposed them upon the face of a check so as to furnish the means for utilizing them without impairing the inconvenience of the check for inspection and handling by bank tellers and clerks in the usual manner. I also impart the additional functions to the check without requiring the use of separate coupons or interfering with the connection of the check directly with the stub in a check-book in the usual manner. All the devices heretofore used to accomplish the same results have in a greater or less degree enlarged or disfigured the check and interfered either with the inspection or handling of the check by the bank clerks. My invention obviates such objection and accomplishes the same results without any inconvenience whatever and without any material expense.

Having thus set forth the nature of the invention, what is claimed herein is—

1. A bank-check of usual form, bearing the name of a bank and usual order for payment, and having upon the face at one end ruled columns with headings for the date and amount of an account.

2. A bank-check of usual form, bearing the name of bank and usual order for payment, and having upon the face at one end ruled columns with headings for the date and amount of an account, and beneath such columns a certificate of verification with space below the same for a verifying-signature.

3. A bank-check of usual form, bearing the name of a bank and usual order for payment, and having upon the face at one end ruled columns with headings for the date, items and amount of an account, and beneath such columns a certificate of verification with space below the same for a verifying-signature, and above such columns a receipt reference, as and for the purpose set forth.

In testimony whereof I have hereunto set my hand in the presence of two subscribing witnesses.

ANSON O. KITTREDGE.

Witnesses:
 FRIEND PITTS, Jr.,
 THOMAS S. CRANE.